United States Patent Office

3,480,561
Patented Nov. 25, 1969

3,480,561
CURING OF POLYESTER COMPOSITIONS
Shoshana Abrahami, Beersheba, Aharon Molcho, Rehovot, and Reuven (Roman) Wachs, Beersheba, Israel, assignors to Makhteshim Chemical Works Ltd., Beersheba, Israel, a corporation of Israel
No Drawing. Filed June 20, 1966, Ser. No. 558,627
Claims priority, application Israel, June 24, 1965, 23,798
Int. Cl. B01j 11/58, 11/32
U.S. Cl. 252—428      4 Claims

ABSTRACT OF THE DISCLOSURE

Accelerators for use in curable polyester compositions are provided by dissolving vanadium pentoxide in concentrated hydrochloric acid, removing water, and admixing with an ester of phosphorous acid.

---

The present invention concerns a process for the curing of unsaturated polyester compositions.

Unsaturated polyester compositions are commercial products comprising polyesters produced from the reactants di- or polybasic acids or anhydrides on the one hand and di- or polyhydroxy alcohols on the other hand, at least one of which reactants comprises non-aromatic unsaturation, in admixture with at least one unsaturated monomer capable of polymerizing with the unsaturated polyester.

For the production of articles from polyester of coating articles therewith the non-cured composition is applied and is cured in situ. During the curing the unsaturated monomer reacts with the polyester, presumably by being grafted thereon and/or by the formation of cross-links between the chains. This reaction has to be catalyzed and, where it is carried out at room temperature or only at a slightly elevated temperature an accelerator has to be used as well.

Conventionally various peroxides and hydroperoxides are used as catalysts. The accelerators conventionally used comprise a variety of metal compounds such as compounds of cobalt, manganese, lead, zinc and iron. Examples of such compounds are cobalt naphthenate, manganese naphthenate, cobalt octoate.

It has also already been proposed to use as accelerators various vanadium compounds. Thus in German patent specification No. 1,070,819 there is described the use of such vanadium compounds as vanadyl-p-toluene sulphonate, vanadylacetate, vanadyloctoate and vanadylacetylacetate. In British patent specification No. 840,021 there is described the use of pentavalent vanadium compounds in combination with benzene phosphinic acid as accelerators. As vanadium compounds that can be used there are mentioned specifically vanadium naphthenate, vanadyl hexamethyl tetramine, vanadyl 8-hydroxyquinolinate, vanadyl diethyldithiocarbamate, vanadium tetramandelate, vanadyl disalicylal ethylenediimine, vanadyl disalicylal ethylenediimine monopyridinate and others. Yet another type of vanadium accelerators is described in British patent specification No. 907,363 being solutions of vanadium compounds in a liquid acid phosphate ester. The vanadium compounds may be organic salts such as vanadium naphthenate or inorganic salts such as ammonium vanadate. Particularly preferred in accordance with the disclosure in the above patent specification is vanadium oxide. Examples of acid phosphate esters to be used in accordance with the British patent are dibutyl hydrogen phosphate, diethyl hydrogen phosphate, dinonyl hydrogen phosphate, diisooctyl hydrogen phosphate, di-N-octyl hydrogen phosphate, dimethyl hydrogen phosphate and others.

The use of vanadium compounds as accelerators has aroused considerable interest as it appears that these are superior to compounds of other metals. However, vanadium compounds that have so far been known to be applicable as accelerators in the curing of polyester compositions are not quite satisfactory in various respects such as undesirable discolouring of the cured polyester, the requirement of relatively large quantities, lack of stability, unsatisfactory pot life when admixed without the catalyst to the polyester compositions and the like. The insufficient pot life is in particular a serious drawback since consumers prefer to receive the polyester compositions with the accelerator already readily admixed thereto.

It follows from the literature and has also been confirmed by investigations conducted in accordance with the present invention that the effectiveness of a certain accelerator depends on the nature of both the metallic and non-metallic moieties thereof. It follows, therefore, that various degrees of effectiveness can be obtained with different vanadium compounds. It is the object of the present invention to provide improved accelerators for the curing of polyester compositions selected from among the class of vanadium compounds.

The invention consists in new accelerators for use in the curing of polyester compositions being vanadium compounds obtained by dissolving vanadium pentoxide-$V_2O_5$— in concentrated aqueous hydrochloric acid and admixing to the resulting solution, if desired after previous partial or complete water removal, an ester of phosphorous acid.

The dissolution of the $V_2O_5$ in HCl is preferably conducted in the heat, e.g. at about 100° C. If desired, a water soluble bisulfite salt may be added before the addition of the phosphorous ester, which reduces still further any discolouring effect of the final composition.

The chemical nature of the above accelerator compositions is not fully established. At any rate it would appear that the resulting vanadium compounds contain chlorine as well as phosphorous ester groups.

The accelerators according to the invention have been found to be superior to all known accelerators including the vanadium compounds according to British patents specification No. 907,363 referred to above. This superiority is expressed both in terms of smaller quantities required for curing a given quantity of a given polyester composition, a weaker discolouring effect, if any, greater stability and longer pot life of ready mixed accelerator containing polyester compositions brought about, as a rule, by stabilization with minute quantities of a copper salt such as copper naphthenate.

The invention also consists in a method of curing an unsaturated polyester composition wherein an organic peroxide, hydroperoxide, perester or peroxyacetal compound is used as catalyst and the accelerator is a composition obtained by a process comprising reacting vanadium pentoxide with concentrated aqueous hydrochloric acid, if desired adding a water soluble bisulfite salt to the solution, and admixing the resulting solution with an ester of phosphorous acid.

The invention further consists in ready mixed unsaturated polyester-accelerator compositions wherein the accelerator is a vanadium composition obtained in the manner defined above.

The invention is illustrated by the following examples without being limited thereto.

EXAMPLE 1

1 g. of $V_2O_5$ was added to 25 cc. of 35% aqueous hydrochloric acid while stirring and heating to 100° C. After almost complete dissolution, undissolved matter was filtered off and to the filtrate was added 86 cc. of dimethyl hydrogen phosphite.

An unsaturated polyester resin was prepared in a conventional manner by heating a mixture of 25 parts by weight maleic acid anhydride, 25 parts by weight of phthalic acid anhydride, 55 parts by weight of propylene glycol and 0.013 part by weight of hydroquinone acting as inhibitor. The process was carried out under a $CO_2$ atmosphere at 205° C. for 7–8 hours. 70 parts by weight of the resulting resin was admixed with 30 parts by weight of styrene.

100 g. of the above composition was cured by adding thereto 50 p.p.m. of the above vanadium composition and 2% by weight of methyl-ethyl ketone peroxide. After 5 minutes at 30° C. the composition congealed.

EXAMPLE 2

1 g. of $V_2O_5$ was added to 25 cc. of 35% aqueous hydrochloric acid and the reaction mixture was kept at 100° C. while stirring. After almost complete dissolution 4 g. of sodium bisulfite was added, the reaction mixture was cooled, undissolved matter was filtered off and from the filtrate some of the water was removed by distillation. Thereafter 80 cc. of triethyl phosphite was added.

To 100 g. of the same polyester composition used in Example 1 there was added 50 p.p.m. of the above vanaidium composition and 2% by weight of cyclohexanone peroxide. The composition congealed after 7 minutes at 30° C.

EXAMPLE 3

To 1 cc. of the accelerator composition prepared in accordance with Example 2 was added 0.01% by weight of a 6% aqueous copper naphthenate solution and the mixture was thoroughly stirred.

To four 100 cc. portions of the polyester composition used in Example 1 were added 50 p.p.m. of the above stabilized accelerator composition. The resulting polyester-accelerator mixtures were left to stand for different times, thereafter admixed with 2% by weight of cumene hydroperoxide and the times of gelation at 25° C. were measured. The results obtained were as follows:

Time after which catalyst was added:

| Time after which catalyst was added: | Time of gelation, minutes |
|---|---|
| Immediately | 15 |
| One month | 18 |
| Two months | 20 |
| Three months | 20.5 |

It is thus seen that the effect of the stabilizer is that it insignficantly slows down the time of gelation as compared to an unstabilized accelerator composition. Against this insignificant slowdown the stabilization enables the prolonged storage of a polyester/accelerator composition.

It should be noted that the polyester composition used in the foregoing examples was selected at random and that the invention is also applicable to any other unsaturated polyester composition. It should further be noted that the accelerator compositions are not confined to those obtained from the phosphorous acid esters described in the foregoing examples and that also compositions obtained by using other phosphorous acid esters are suitable.

Likewise the nature of the catalyst is not critical and any organic peroxide, hydroperoxide, perester or peroxyacetal that is conventionally used in the curing of polyester compositions can be applied in accordance with the invention.

We claim:
1. An accelerator composition for use in the curing of polyester compositions consisting essentially of water and a vanadium compound obtained by dissolving vanadium pentoxide in concentrated aqueous hydrochloric acid and admixing to the resulting solution an alkyl ester of phosphorous acid.

2. An accelerator corresponding to claim 1, wherein at least part of the originally present water has been removed by evaporation.

3. Accelerator composition according to claim 1, also containing a minor amount, sufficient to inhibit discoloring, of a water soluble alkali metal bisulfite salt.

4. Accelerator composition according to claim 1, stabilized with a minor amount, sufficient to impart longer pot life, of an organic copper salt.

References Cited

UNITED STATES PATENTS

| 3,028,360 | 4/1962 | Brooks et al. | 260—863 XR |
| 3,238,274 | 3/1966 | Allan | 260—863 |
| 3,333,021 | 7/1967 | Geipert | 260—863 |

PATRICK P. GARVIN, Primary Examiner

U.S. Cl. X.R.

252—429, 431; 260—863